3,325,509
SUBSTITUTED 1,2-DIPHENYL-3,5-DIOXO-
PYRAZOLIDINES
Rudolf Pfister and Franz Häfliger, Basel, Switzerland, assignors to Geigy Chemical Corporation, Greenburgh, N.Y., a corporation of Delaware
No Drawing. Filed Jan. 20, 1964, Ser. No. 340,120
Claims priority, application Switzerland, Jan. 24, 1963, 841/63
5 Claims. (Cl. 260—310)

This invention relates to new derivatives of 1,2-diphenyl-3,5-dioxo-pyrazolidine which have valuable pharmacological properties. 1,2 - diphenyl - 3,5 - dioxo - 4 - n-butyl-pyrazolidine (phenylbutazone), as a medicament has attained great therapeutical importance in particular for the treatment of acute and chronic inflammatory diseases.

It has now been found that 4-substituted 1,2-diaryl-3,5-dioxo-pyrazolidines of the general Formula I,

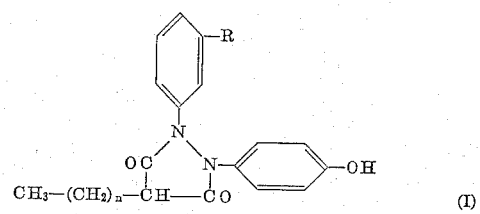

wherein R represents an alkyl radical having at most 3 carbon atoms, and $n$ represents 2–4, and their salts with inorganic and organic bases also possess valuable antiphlogistic properties. At the same time, however, the compounds of the general Formula I, such as e.g. 1-(m-tolyl)-2 - (p - hydroxyphenyl) - 4 - n - butyl - 3,5 - dioxo-pyrazolidine, are favourably distinguished from similar compounds with regard to side effects as explained more in detail below. They are also superior in their great intensity of action, therefore permitting dosages used to be considerably decreased, and reducing the amount of foreign matter in the organism. This also facilitates the parenteral, in particular the intramuscular administration. In animal tests (rat) the previously mentioned 1-(m-tolyl) - 2 - (p - hydroxy - phenyl) - 4 - n - butyl - 3,5-dioxo-pyrazolidine does not show any inhibiting action on the elimination of electrolytes stimulated by sulphonamide diuretics.

Furthermore, the strong inhibition of biosynthesis of sulphated polysaccharides such as chondroitin sulphuric acid in granulation tissue, as determined in animal experiments, is noteworthy.

The new compounds of general Formula I are suitable, for example, for the treatment of rheumatic diseases, for which purposes they can be administered per os or rectally or, in the form of aqueous solutions of their salts, also parenterally, e.g. intramuscularly or intravenously.

In the above general Formula I, the substituent in the 4-position of the pyrazole ring is an n-propyl, n-butyl or n-pentyl radical corresponding to the meaning of $n$. R is a methyl, ethyl, n-propyl or isopropyl radical.

The new compounds of the general Formula I are produced by treating a compound of the general Formula II

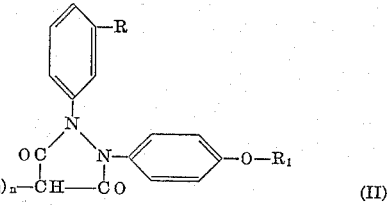

wherein $R_1$ is an arylmethyl or diarylmethyl radical and R and $n$ have the meanings given above, with catalytically activated hydrogen until substantially the equimolar amount of hydrogen has been taken up, or by subjecting a compound of the general Formula III

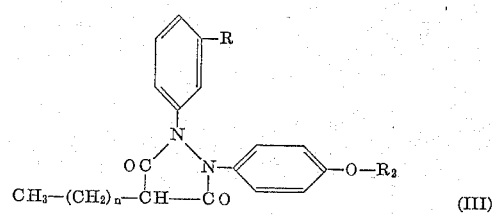

wherein $R_2$ is an acyl radical or an α-alkoxy-alkyl radical, whereby the alkyl radical or the alkoxy substituent can be bound to the parent chain in the form of a ring to a tetrahydropyranyl radical, and R and $n$ have the meanings given above, to solvolysis. If desired, the compound of the general Formula I obtained is converted into a salt with an inorganic or organic base.

Starting materials of the general Formula II in which $R_1$ is preferably the benzyl or benzhydryl radical, are hydrogenolysed e.g. in alkaline-aqueous solution or in an inert organic solvent such as, e.g. ethanol, in the presence of Raney nickel or a noble metal catalyst such as e.g. palladium on charcoal. The hydrogenolysis can be performed at room temperature and atmospheric pressure until no more hydrogen is taken up; under more drastic conditions, the hydrogenation sometimes has to be broken off after the theoretical amount of hydrogen has been taken up in order to avoid side reactions.

Dilute hydrochloric acid in methanol at a moderately raised to boiling temperature is suitable, for example, for the solvolysis of starting materials of the general Formula III wherein $R_2$ is an α-alkoxy-alkyl radical, e.g. a methoxy-methyl radical, an α-methoxy-ethyl radical, α-ethoxy-ethyl radical, α-n-butoxy-ethyl radical or a tetrahydropyranyl-(2) radical.

In addition, an α-alkoxy-alkyl radical $R_2$ can be split off, for example, by treatment with methanol or another low alkanol in the presence of an acid catalyst such as sulphuric acid, p-toluene sulphonic acid or by means of the mixture of acid phosphoric acid ester and polyphosphoric acid ester formed on adding phosphorus pentoxide to the alkanol, or of a Lewis acid such as, e.g. aluminium chloride or borontrifluoride, at room temperature or at moderately raised temperature.

Dilute sodium hydroxide solution, for example, at moderately raised to boiling temperature can serve for the hydrolysis of starting material having an acyl radical, in particular an acetyl radical $R_2$. An acyl radical $R_2$ can be split off under anhydrous conditions, for example, by treatment of a corresponding compound of general formula III with methanolic ammonia solution.

The starting materials of the general Formulae II and III can be produced by various related methods, for example by condensing malonic acids of the general Formula IV

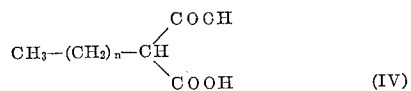

wherein $n$ has the meaning given above, with hydrazobenzene derivatives of the general Formula V, VI or VII,

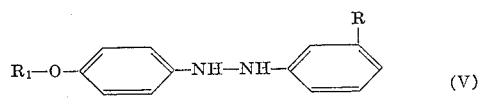

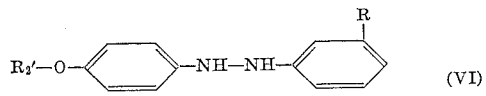

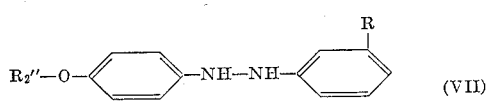

wherein $R_2'$ represents an α-alkoxy-alkyl radical, whereby the alkyl radical of the alkoxy substituent can be bound to parent chain in the form of a ring, and $R_2''$ represents an acyl radical, and R and $R_1$ have the meanings given above, the condensation being performed in the presence of N,N'-disubstituted carbodiimides, in particular N,N'-dicyclohexyl-carbodiimide in dioxan solution, also by condensing malonic acid dihalides of the general Formula IV with hydrazobenzene derivatives of the general Formulae V or VII in the presence of acid binding agents, e.g. tertiary organic bases such as pyridine, dimethylaniline, triethylamine or tributylamine, in the presence or absence of additional organic solvents such as chloroform, diethyl ether or diisopropyl ether, this condensation being performed at room temperature to the boiling temperature of the reaction medium.

Furthermore, the starting materials of the general Formula II as well as some of those of the general Formula III can be produced by condensing dialkyl esters of malonic acids of the general Formula IV with hydrazobenzene derivatives of the general Formula V or VI in the presence of alkaline condensing agents, or by condensing alkyl ester halides of malonic acids of the general Formula IV with hydrazobenzene derivatives of the general Formula V or VI in the presence of acid binding agents and treating the reaction products immediately obtained with alkaline condensing agents. The condensation of malonic acid dialkyl esters with hydrazobenzene derivatives is preferably performed in organic solvents such as benzene, toluene, xylene, butanol or dibutyl ester, at raised temperatures, e.g. between 80–160°, the alcohol liberated being continuously distilled off. In this reaction, generally those alkaline condensing agents are suitable which are capable of replacing a mobile hydrogen atom by a metal atom, e.g. alkali metals or their alcoholates, amides, hydrides and metal organic compounds such as sodium, potassium, lithium, sodium ethylate, potassium ethylate, sodium amide, lithium hydride, phenyllithium and butyllithium. The acid binding agents mentioned previously can serve for the reaction of alkyl ester halides with hydrazobenzene derivatives and then the alkaline condensing agents mentioned above can be used. In this reaction, however, the ring may sometimes be closed under milder conditions than when the malonic acid dialkyl esters are used.

Finally, it is also possible to produce starting materials of the general Formulae II and III by introducing, by known methods, an n-alkyl radical having 3 to 5 carbon atoms in the 4-position of analogous pyrazoline compounds which are unsubstituted in this position. For this purpose, for example, corresponding 4-unsubstituted compounds are condensed with propionaldehyde, butyraldehyde or valeraldehyde or with corresponding unsaturated aldehydes such as crotonaldehyde, e.g. by boiling in glacial acetic acid, and the 4-alkylidene or 4-alkenylidene compounds obtained are hydrogenated to form starting materials of the general Formulae II and III. This hydrogenation of the semicyclic double bond and of any extracyclic double bond present can sometimes be performed simultaneously with the hydrogenolysis; however, this method of introducing the 4-substituent is not limited to compounds having an arylmethyl or diarylmethyl radical $R_1$.

The new compounds of the general Formula I form fairly easily to easily soluble monobasic salts with alkali hydroxides. Solutions thereof can be produced by dissolving the new compounds in the calculated amount of alkali lye, i.e. in solutions of lithium, sodium or potassium hydroxide. The new compounds are also soluble in alkali carbonate solutions.

The new compounds according to the invention or their alkali metal salts or salts with organic bases such as, e.g. dimethylaminoethanol, diethylaminoethanol or piperazine, can be converted into pharmaceuticals by combining them with suitable pharmaceutical carriers. The solutions of the alkali metal salts of the new compounds mentioned above have a weakly alkaline reaction and are well suited for injection purposes. The pharmaceuticals can also be capsules, powders, tablets and other forms suitable for oral administration and can be produced, e.g. by mixing the active substances, i.e. the new 1,2-diaryl-4-alkyl-3,5-dioxo-pyrazolidines with pharmaceutical carriers such as starch, lactose, stearic acid, talcum, magnesium stearate etc. They can also be worked up, however, with semi-solid substances having a suitable melting range, e.g. cocoa butter, to form suppositories.

The following examples illustrate the production of the new compounds but are by no means the only methods of production. The temperatures are in degrees centigrade.

*Example 1*

(a) 125 g. of sodium hydroxide are dissolved in 3 litres of methanol. After adding 302 g. of p-benzyloxy-m'-methyl-azobenzene (M.P. 81°) 200 g. of zinc dust are added in five equal portions at reflux temperature under an atmosphere of nitrogen, the addition being made within 30 minutes while stirring. The reaction mixture is then stirred for about 15 minutes, i.e. until it is no longer yellowish coloured. It is then filtered and the filtrate is concentrated at 11 torr to about half its volume. The residue contains the crude p-benzyloxy-m'-methyl-hydrazobenzene.

(b) 2000 ml. of benzene and 1000 ml. of water are added to the residue obtained according to (a). The organic phase is separated, dried over sodium sulphate and poured into a reaction vessel. After distilling off about 1500 ml. of benzene, a sodium ethylate solution prepared from 23 g. of sodium and 400 ml. of abs. ethanol and then adding 216 g. of n-butyl malonic acid diethyl ester is added and then 500 ml. of xylene are poured in. The reaction mixture is then heated for 12 hours at a bath temperature of 130–140° in a vessel fitted with a sloping condenser, whereupon the solvent and liberated ethanol pass over. After cooling, the reaction mixture is stirred at 5° with 1500 ml. of ice water until a two-phase solution is attained. The aqueous phase is extracted twice with 500 ml. of ether each time and then made acid to Congo paper while stirring vigorously with hydrochloric acid. The crystals obtained are washed neutral with water and recrystallised from ethanol. The 1-(m-tolyl)-2-(p-benzyloxy-phenyl)-4-n-butyl-3,5-dioxo-pyrazolidine so obtained melts at 120°.

(c) 96 g. of 1-(m-tolyl)-2-(p-benzyloxy-phenyl)-4-n-butyl-3,5-dioxo-pyrazolidine are dissolved in a solution of 18 g. of sodium hydroxide in 500 ml. of water and hydrogenated at room temperature and atmospheric pressure in the presence of 30 g. Raney nickel. The hydrogen take-up ceases after 9 hours, after it has attained about 93% of the theoretical. The catalyst is filtered off, the filtrate is extracted twice with ether and then made acid to Congo paper with concentrated hydrochloric acid. The precipitated reaction product is taken up in ethyl acetate. After washing with water and thoroughly drying over sodium sulphate, the ethyl acetate solution is concentrated in vacuo and as much petroleum ether as possible is added without the solution becoming permanently cloudy. The 1-(m-tolyl)-2-(p-hydroxyphenyl)-4-n-butyl-3,5-dioxo-pyrazolidine gradually crystallises out. It melts at 113°.

Example 2

25 g. of m-methyl-p'-acetoxy-hydrazobenzene are dissolved in a mixture of 17.6 g. of pyridine and 200 ml. of chloroform. At 0–5°, a solution of 19.7 g. of n-butyl malonic acid dichloride in 100 ml. of chloroform is added dropwise while stirring. The reaction mixture is left to stand for 12 hours at room temperature and is then poured onto ice. The organic phase is separated, extracted at 0–5° with dilute hydrochloric acid and then twice with 500 ml. of sodium carbonate solution each time.

These extracts are made acid to Congo paper, the oil which precipitates is dissolved in ethyl acetate, the solution is dried with sodium sulphate and concentrated at 11 torr. The 1-(m-tolyl)-2-(p-acetoxy-phenyl)-3,5-dioxo-4-n-butyl-pyrazolidine is an oil, so that it is hydrolysed without further purification. The residue (about 30 g.) is dissolved in 300 ml. of 2 N sodium hydroxide solution and heated for 30 minutes at 90–95°. The solution is filtered with charcoal and, after covering with 300 ml. of ethyl acetate, it is made acid to Congo paper with concentrated hydrochloric acid. The organic phase is worked up as described in Example 1 to obtain 1-(m-tolyl)-2-(p-hydroxyphenyl)-3,5-dioxo-4-n-butyl-pyrazolidine.

Example 3

16 g. of n-butyl malonic acid are dissolved in 500 ml. of abs. dioxan, 30 g. of m-methyl-p'-[tetrahydropyranyl-($\alpha$)-oxy]-hydrazobenzene are added and 45 g. of dicyclohexyl carbodiimide are added all at once to the solution. The reaction mixture is left to stand overnight at room temperature. The precipitated dicyclohexyl urea is filtered off under suction and the filtrate is concentrated at 11 torr. The residue is dissolved in 1000 ml. of ethyl acetate and the solution is extracted twice with 500 ml. of 1 N sodium carbonate solution each time. The pH of the extracts is adjusted to 5 with acetic acid and the oil which separates is dissolved in ethyl acetate. The solution obtained is dried 1-(m-tolyl)-2-[p-(tetrahydropyranyl-($\alpha$)-oxy)-phenyl]-3,5-dioxo-4-n-butyl-pyrazolidine can not be crystallised so that it is hydrolysed direct. 4.2 g. are dissolved in 84 ml. of methanol, 8.4 ml. of 1 N hydrochloric acid are added and the mixture is refluxed for 30 minutes. 8.4 ml. of 1 N sodium hydroxide solution are added at room temperature and the mixture is concentrated at 11 torr. The residue is distributed between ethylacetate and water. The organic phase is dried over sodium sulphate and concentrated. 1-(m-tolyl)-2-(p-hydroxyphenyl)-3,5-dioxo-4-n-butyl-pyrazolidine is recrystallised as described in Example 1.

In an analogous manner 1-(m-tolyl)-2-(p-hydroxyphenyl)-3,5-dioxo-4-n-propyl-pyrazolidine, M.P. 125° and 1-(m-tolyl)-2-(p-hydroxyphenyl)-3,5-dioxo-4-n-amyl-pyrazolidine, M.P. 71°, are obtained, as described in Examples 1 to 3.

Example 4

Manufacturing instructions for the products of coated tablets each containing 50 mg. of active substance:

A:
|  | G. |
| --- | --- |
| 1-(m-tolyl)-2-(p-hydroxyphenyl)-4-n-butyl-3,5-dioxo-pyrazolidine | 50 |
| Lactose | 12.5 |
| Aerosil uncompressed | 2.5 |

B:
|  | |
| --- | --- |
| Stearic acid | 1 |
| Glycerine | 2.5 |

C:
|  | |
| --- | --- |
| Potato starch dried | 45 |
| Talcum | 11.5 |
| Magnesium stearate | 1 |
| | 126 |

The substances listed under A above are well mixed and moistened with the granulating solution B. The mass so moistened is granulated through a sieve passing 49–64 meshes per square centimeter. The moist granulate is then dried for about 12 hours at about 20°. The dried granulate is again sieved through a sieve of the same mesh number and then intimately mixed with the substances listed under C. The resulting mass is then compressed into cores each of which has a diameter of 7 millimeters and a weight of 126 mg., and contains 50 mg. of active substance.

The production of the dragées is then completed in a conventional manner by applying to the same a conventional coating solution. In this manner, dragées having a total weight (i.e. core+coating) of 150 mg. and containing 50 mg. of active substance are obtained.

The unexpected nature of the compound of Formula I is further illustrated by a comparation test concerning anti-inflammatory activity carried out with the following compounds:

(I) 1-(m-tolyl)-2-(p-hydroxyphenyl)-4-n-butyl-3,5-dioxo-pyrazolidine as described in this application.
(II) 1-phenyl-2-(p-hydroxyphenyl)-4-n-butyl-3,5-dioxo-pyrazolidine.
(III) 1-(m-tolyl)-2-(p-hydroxyphenyl)-4-tert-butyl-3,5-dioxo-pyrazolidine.
(IV) 1-(m-tolyl)-2-(p-hydroxyphenyl)-4-$\gamma,\gamma$-dimethyl-n-butyl-3,5-dioxo-pyrazolidine.

of which Compound I is a preferred compound according to the invention, falling under Formula I, while Compounds II, III and IV are known.

The anti-inflammatory activity of these compounds was determined as follows:

The compounds to be tested were each dissolved in an injection solution and administered intraperitoneally (i.p.) in the doses given in the table below, to a group of 20 rats weighing about 120 g. each. One hour after the administration of the test compound, one hind paw of each rat was injected with 0.1 ml. of a 0.75% formaldehyde solution in order to cause inflammation. Two hours after this injection, the extent of swelling was determined by comparison of the inflamed and the normal hind paw of each rat by one of the following equivalent methods, giving strictly comparable results:

For volumetrical evaluation (Compounds II and III) each hind paw of each rat was dipped into a fairly narrow tube filled to the top with water and after the paw was withdrawn, the volume of water necessary to bring the content of the tube to its original level was measured, i.e. water was added by means of a micro-pipette. In order to obtain the most exact results possible, the measurements of said inflamed hind paw and said normal hind paw were each taken three times, the animals being kept under short ether narcosis during the process. The extent to which the paws had to be dipped was fixed by a clip placed just above the malveolus. The extent of swelling was calculated from the difference in volume between the two paws of each animal.

For gravimetrical evaluation, the animals were sacrificed 2 hours after formaldehyde injection. Their hind paws were amputated, weighed, and the extent of swelling then again calculated from the difference in weight between the two paws of each animal.

For the test series with volumetrical evaluation and those with gravimetrical evaluation, separate control series with 40 animals each were run in order to determine the extent of swelling attained by the injection of formaldehyde without previous administration of a test compound.

The reduction of swelling attained with each of Compounds I to IV was calculated in percent as the difference of the average swelling between the control animals and test animals, taking that of the control animals as 100%.

The results attained are shown in the table below:

| Compound | Dosis mg./kg. i.p. on rats | Reduction of swelling in percent |
|---|---|---|
| I | 10 | 38 |
|   | 25 | 50 |
| II | 25 | 23 |
|    | 50 | 34 |
|    | 75 | 33 |
| III | 25 | 15 |
| IV | 25 | 15 |

The Compound I according to the invention showed a significant anti-inflammatory action when applied in doses as low as 10 mg. i.p. to rats. In order to obtain the same effect, it would be necessary to inject a 7½ times larger amount of Compound II, while Compounds III and IV afforded with 2½ times the amount of active substance only half the anti-inflammatory effect of Compound I.

We claim:
1. A member selected from among the 1,2-diphenyl-3,5-dioxo-pyrazolidine derivatives of the formula

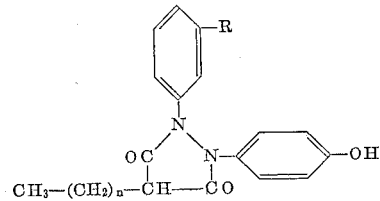

wherein
R represents an alkyl radical having at most 3 carbon atoms and
$n$ is an integer of from 2 to 4, and
the non-toxic, pharmaceutically acceptable addition salts thereof with inorganic or organic bases.

2. A member selected from the group consisting of a compound of the formula

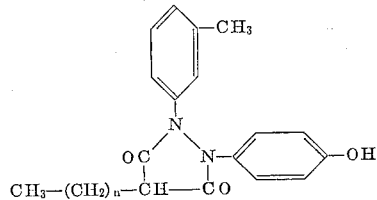

wherein
$n$ is an integer of from 2 to 4
and the non-toxic, pharmaceutically acceptable addition salts thereof with alkali hydroxides or organic bases.

3. 1 - (m - tolyl) - 2 - (p-hydroxyphenyl)-4-n-butyl-3,5-dioxo-pyrazolidine.
4. 1 - (m - tolyl) - 2-(p-hydroxyphenyl)-3,5-dioxo-4-n-propyl-pyrazolidine.
5. 1 - (m - tolyl) - 2-(p-hydroxyphenyl)-3,5-dioxo-4-n-amyl-pyrazolidine.

References Cited
UNITED STATES PATENTS 2,745,783   5/1956   Häfliger _____ 260—310

OTHER REFERENCES

German printed application 1,039,063, July 1958, Häfliger et al.

WALTER A. MODANCE, Primary Examiner.
NATALIE TROUSOF, Assistant Examiner.

UNITED STATES PATENT OFFICE
CERTIFICATE OF CORRECTION

Patent No. 3,325,509                                June 13, 1967

Rudolf Pfister et al.

It is hereby certified that error appears in the above numbered patent requiring correction and that the said Letters Patent should read as corrected below.

Column 5, lines 58 and 59, strike out "is dissolved in ethyl acetate. The solution obtained is dried 1-(m-tolyl)-2-[p-(tetrahydropyranyl-(α)-oxy)-phenyl]-" and insert instead -- is dissolved in ethyl acetate. The solution obtained is dried with sodium sulphate and concentrated at 11 Torr. The 1-(m-tolyl)-2-[p-(tetrahydropyranyl-(α)-oxy)-phenyl]- --.

Signed and sealed this 22nd day of October 1968.

(SEAL)
Attest:

Edward M. Fletcher, Jr.                               EDWARD J. BRENNER
Attesting Officer                                      Commissioner of Patents